(12) United States Patent
Boffelli

(10) Patent No.: US 11,143,087 B2
(45) Date of Patent: Oct. 12, 2021

(54) PUMP FOR RECIRCULATING A COOLING LIQUID FOR COMBUSTION ENGINES WITH HYBRID CONTROL SYSTEM COMPRISING ELECTROMAGNETIC FRICTION COUPLING AND ELECTRIC MOTOR WHICH ARE AXIALLY OFFSET

(71) Applicant: BARUFFALDI S.P.A., Tribiano (IT)

(72) Inventor: Piercarlo Boffelli, Tribiano (IT)

(*) Notice: Subject to any disclaimer, the term of this patent is extended or adjusted under 35 U.S.C. 154(b) by 38 days.

(21) Appl. No.: 16/964,524

(22) PCT Filed: Jun. 13, 2018

(86) PCT No.: PCT/IB2018/054292
§ 371 (c)(1),
(2) Date: Jul. 23, 2020

(87) PCT Pub. No.: WO2018/229669
PCT Pub. Date: Dec. 20, 2018

(65) Prior Publication Data
US 2021/0079831 A1 Mar. 18, 2021

(30) Foreign Application Priority Data
Jun. 15, 2017 (IT) .................. 102017000066323

(51) Int. Cl.
*F01P 5/12* (2006.01)
*F02B 63/04* (2006.01)
*F02B 67/06* (2006.01)
*F04D 13/02* (2006.01)
*F04D 13/06* (2006.01)
*F16D 27/112* (2006.01)

(52) U.S. Cl.
CPC .............. *F01P 5/12* (2013.01); *F02B 63/042* (2013.01); *F02B 67/06* (2013.01); *F04D 13/024* (2013.01); *F04D 13/06* (2013.01); *F16D 27/112* (2013.01)

(58) Field of Classification Search
CPC ........ F02B 63/042; F02B 67/06; F04D 13/06; F04D 13/025; F01P 5/12
See application file for complete search history.

(56) References Cited

U.S. PATENT DOCUMENTS

| 5,119,918 A * | 6/1992 | Pardee | F16D 67/06 192/18 B |
| 2005/0031455 A1* | 2/2005 | Boffelli | F04D 13/026 417/213 |
| 2006/0165539 A1* | 7/2006 | Boffelli | F01P 5/12 417/319 |

FOREIGN PATENT DOCUMENTS

WO   WO-2015166458 A1 * 11/2015 ........... F04D 13/021

* cited by examiner

*Primary Examiner* — Kevin A Lathers

(57) ABSTRACT

A pump for recirculating the cooling liquid of combustion engines, in particular of vehicles, with a hybrid control system that includes an electromagnetic friction coupling and electric motor. The pump is capable of recirculating cooling liquids to produce a variation in the speed of the rotation of the impeller depending on the requirements of the engine.

9 Claims, 1 Drawing Sheet

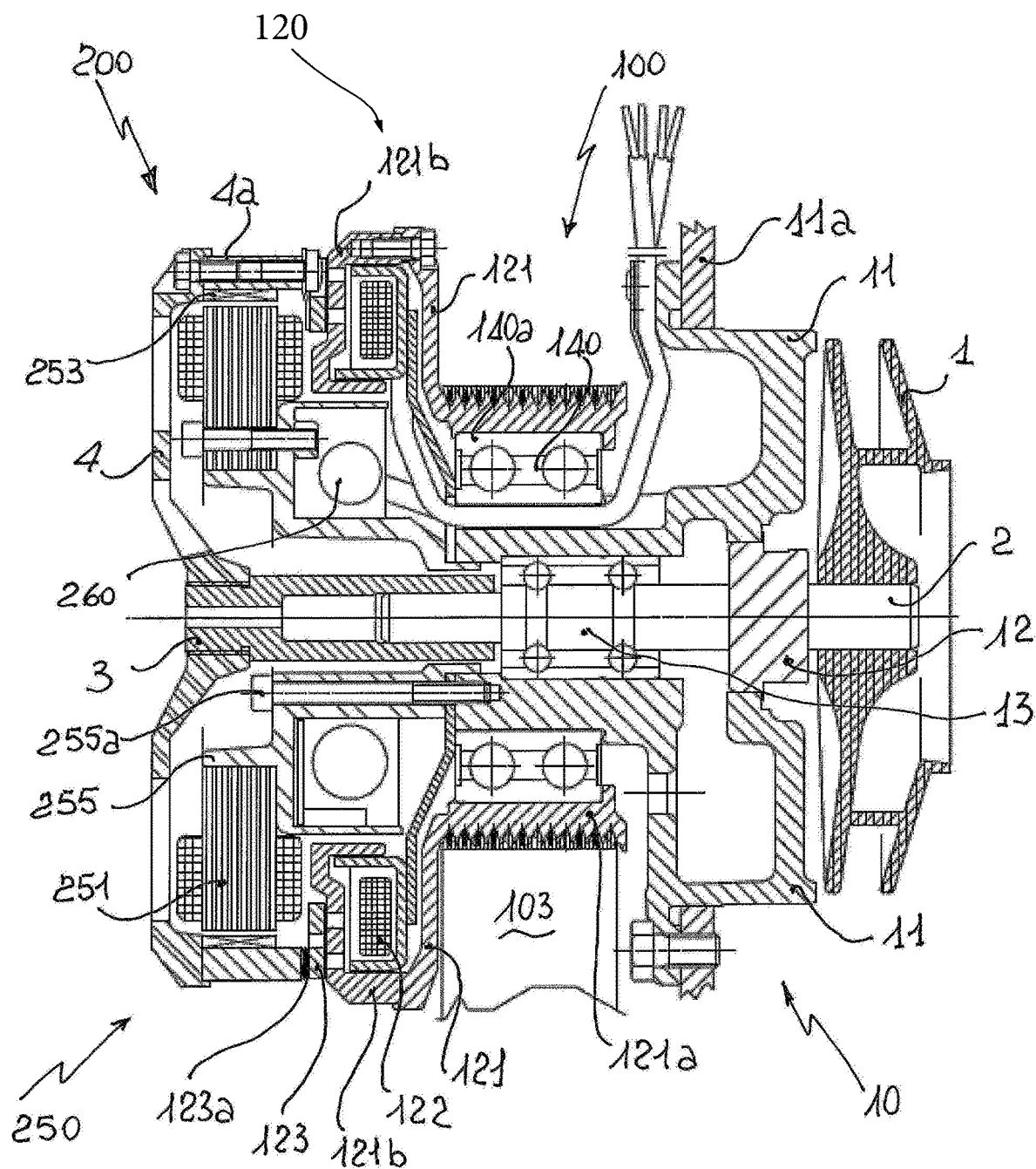

PUMP FOR RECIRCULATING A COOLING LIQUID FOR COMBUSTION ENGINES WITH HYBRID CONTROL SYSTEM COMPRISING ELECTROMAGNETIC FRICTION COUPLING AND ELECTRIC MOTOR WHICH ARE AXIALLY OFFSET

FIELD OF THE INVENTION

The present invention relates to a pump for recirculating the cooling liquid of combustion engines, in particular of vehicles, with a hybrid control system comprising electromagnetic friction coupling and electric motor.

BACKGROUND OF THE INVENTION

It is known in the sector for the production of engines, in particular combustion engines, that it is required to cool said engines.

In this sector it is known that cooling is performed, on the one hand, by means of fans for drawing in air (a fluid in the gaseous state), said fans being able to draw in the air and force it across the cells of the radiator so as to cool it. An example of these fans is described in WO 2011/047268 A2 which describes a fan, the shaft of which may be rotationally actuated by means of an electric motor or by means of the transmission of the rotational movement of a shaft of the vehicle engine, which is transmitted to the fan by means of movement transmission means and a viscous joint. Direct cooling of the engine is instead performed by means of recirculation of a cooling liquid, normally water, which is moved by means of a device different from the intake fan, generally consisting of a recirculation pump, the impeller of which is rotated by a shaft operated by a pulley and a belt connected to the driving shaft, so as to circulate by means of pumping a cooling liquid contained in a closed circuit which passes through the combustion engine so as to cool it.

It is also known that recirculation of the cooling liquid must be performed with a flow rate corresponding to the actual cooling requirement determined by the real conditions of use of the engine and the external temperature, so as to avoid having to operate constantly and unnecessarily at full speed devices which draw useful power, increasing the wear of the various component parts and the consumption levels of the vehicle.

It is also known that, in order to solve this problem, devices have been proposed for controlling operation of the pump impeller, rotation of which depends on the engagement of a friction coupling for transmission of a rotational movement depending on the revolutions of the driving shaft, and on an electric motor which instead is activated when the friction coupling is disengaged, so as to perform a rotation at a controlled speed independent of the driving shaft.

Examples of such devices are for example known from IT 1,417,824.

Although fulfilling their function these devices nevertheless have drawbacks which limit their uses, in particular since they envisage the positioning of the friction coupling in a position axially concentric with the electric motor, thereby resulting in an increase in the radial dimensions of the assembly which are not compatible with the small dimensions of the seats for housing the assembly inside the engine compartment.

SUMMARY OF THE INVENTION

The technical problem which is posed therefore is that of providing a pump for recirculating cooling liquids for engines of vehicles and the like able to produce a variation in the speed of rotation of the impeller depending on the actual operating requirement of the engine.

In connection with this problem it is also required that this device should have small dimensions, in particular radial dimensions.

A further particular desirable aspect is that the pump should be able to output high torques also at a low speed of rotation of the combustion engine, so as to be applicable also to high-capacity pumps of heavy vehicles having an engine with a low number of revolutions, or rotation of the impeller at a low number of revolutions when the combustion engine is running at a high speed.

It is also preferably required the device should be easy and inexpensive to produce and assemble and be able to be easily installed on the pump body without the need for special adaptation.

These results are obtained according to the present invention by a pump for recirculating cooling liquids for the engines of vehicles and the like according to the characteristic features of claim 1, which allows the speed of rotation of the pump impeller to be adjusted in relation to the actual operating requirement of the engine, while limiting at the same time the dimensions, in particular the radial dimensions.

BRIEF DESCRIPTION OF THE DRAWING FIGURES

Further details may be obtained from the following description of a non-limiting example of embodiment of the subject of the present invention, provided with reference to the accompanying drawings, in which:

FIG. 1 shows a cross-sectional view along a vertical diametral plane of an example of embodiment of the device according to the present invention.

DETAILED DESCRIPTION OF THE INVENTION

As shown in FIG. 1, the impeller 1 of a pump for recirculating the cooling liquid of vehicles and the like is mounted on a first end of a shaft 2 supported by a fixed group 10 comprising the pump body 11 which in turn is fixed to the base 11a of the vehicle engine.

A sealing gasket 12, coaxial with the shaft 2, and a bearing 13 on which the inner ring of which the impeller shaft 2 is keyed, are arranged inside the pump body 11.

The end of the shaft 2 opposite to that for connection to the impeller 1 has, inserted inside it, a coaxial sleeve 3 which has, fastened thereto, a bell member 4 which carries a ring 4a with a suitable axial thickness for connection to the movement generating means so as to transmit said movement to the pump shaft 2, as will become clear below.

According to the invention it is envisaged that said movement generating means comprise a first device 100 for transmitting the movement generated by the shaft of the combustion engine and a second device 200 for generating a movement independent of that of the combustion engine.

In greater detail:

the first movement transmission device 100 comprises preferably a second bearing 140 which is mounted on the outside of the pump body 11 and the outer ring 140a of which is integral with a circular ring 121 which is suitably shaped and which has, formed on its outer circumferential edge, a pulley 121a which is suitable for engagement with a belt 103, which forms a preferred example of means for receiving the movement from the shaft of the combustion engine and transmitting the movement to the ring 121 and from the latter to the shaft 2 of the pump.

Since the pulling force of the belt 103 is transmitted onto the outer bearing 140 it is possible to limit the size of the inner bearing 13 which is not subject to dynamic loads induced by the belt, thus increasing the working life and limiting the overall dimensions.

The circular ring 121 has a shaped extension 121b which forms the mechanical rotor 121b of an electromagnetic coupling 120 which comprises an electromagnet 122, which is fixed to the pump body and housed inside a corresponding seat of the said mechanical rotor 121b, and an armature 123 arranged facing the electromagnet 122 on the opposite side to the latter with respect to the mechanical rotor 121b in the axial direction; the armature 123 is connected to the ring 4a by means of a resilient membrane 123a able to allow axial movements of the armature, while preventing however the relative rotation thereof with respect the mechanical rotor 121b and/or the ring 4a.

the second movement generating device 200 comprises an electric motor 250 with a stator 251 and a rotor 253. Preferably, the stator 251 is supported by a structure 255 which is fixed to the pump body by means of screws 255a, the electric rotor 253 thereof, situated radially on the outside of the stator 251, being integral with the ring 4a for connection to the bell member 4 for transmitting the movement to the shaft 2 of the pump; the electric power for the motor may be supplied by means of cables passing between the inner ring of the bearing 140 and the pump body 11 and connected to an electric power source of the motor and to a drive unit 260 of the electric motor.

The preferred arrangement of the electric rotor 253 in a position radially on the outside of the stator 251 also allows high torques to be transmitted to the shaft 2 of the pump owing to the significant diametral length of the bell member 4.

As shown in FIG. 1, it is envisaged that the axially staggered relative arrangement of the first movement transmission device 100 and second movement generating device 200 provides a volume able to contain a drive unit 260 for controlling the electric motor 250, which can be positioned between the stator 251 and the electromagnet 122.

Although not shown, it is also envisaged that the electronic drive of the electric motor may be arranged in an axially inner position which is coaxial—preferably concentric—with the stator of the electric motor. In this case, preferably, the structure 255 fixed to the pump body supports the electronic drive and the stator of the motor in a radially inner and radially outer position respectively.

This configuration allows the entire pump to be prepared at the production site and to be fitted to the combustion engine without the need for special measures during installation.

With this configuration the operating principle of the pump is as follows:

when the electromagnet 122 is in the de-energized condition, the armature 123 is constantly disengaged from the mechanical rotor 121b, the shaft 2 of the pump is therefore in the idle condition and it is possible to excite the electric motor 250 by means of the drive 260; the excitation causes rotation of the electric rotor 253, integral with the ring 4a, which transmits the movement to the shaft 2 of the pump via the bell 4 and the sleeve 3;

excitation of the motor is performed by means of the current supplied by the battery of the combustion engine, which may be of 12V or 24V dc type, this being therefore generally sufficient to allow rotations of the pump shaft only up to about 50% of the maximum speed which can be output with the connection to the combustion engine.

should a rotation of the impeller 1 with a higher number of revolutions be required, the power supply of the electric motor is disconnected, while the electromagnetic friction coupling 120 is instead engaged;

when the coupling 120 and the electric motor 200 are in the de-energized condition, the shaft 2 of the pump does not receive movement, remaining at a standstill in the idle condition.

when the electromagnet 122 is in the excited condition, the induced magnetic field overcomes the resistance of the membrane 123a, axially recalling the armature 123 which engages with the mechanical rotor 121b with which it starts to rotate; since the rotor is connected to the pulley 121a and therefore to the shaft of the combustion engine by means of the belt 103, the impeller rotates at the speed determined by the driving shaft. In this operating condition, the electric rotor integral with the mechanical rotor is rotationally driven by the friction coupling and induces a current on the stator, thus generating recoverable and utilizable energy.

On the other hand:

if, in the idle condition of the shaft 2, a rotation of the impeller 1 with a number of revolutions smaller than that determined by the mechanical rotor 121b is required, the coupling 220 is disengaged and the electric motor 250 is powered so that the movement of the electric rotor 253 causes rotation of the shaft 2 at the desired speed of rotation suitable for determining recirculation of the liquid which is actually required.

According to a preferred embodiment, excitation of the electromagnet 122 is controlled by means of the PWM (Pulse Width Modulation) technique, namely modulation of the power supply voltage, so as to supply a higher voltage level for a short time period (over-pulse), thereby overcoming the resistance of the armature membrane, and short-duration pulses and a quantity of current once the armature is engaged with the mechanical rotor 121b, whereby a small maintenance current required; the PWM is conventional per se and therefore will not be described in detail.

It is therefore clear how with the pump according to the invention it is possible to obtain efficient recirculation of the vehicle cooling liquid which may be varied depending on the actual need by means of alternate operation by the combustion engine or by an auxiliary electric motor; at the same time, however, small radial dimensions may be maintained owing to the particular arrangement of the electric motor arranged in a position axially on the outside of the electromagnetic friction coupling for connection to the said combustion engine.

Owing to these small radial dimensions, it is also possible to obtain a pulley 121a with a small diameter with a consequent multiplication of the revolutions transmitted by the belt 3, thus making the device, and therefore the pump, suitable also for vehicles with engines which run with a small number of revolutions, but require a high speed of rotation of the cooling pump.

It is also envisaged that, when the electromagnet 122 is de-energized, the pump may be operated:

with a small number of revolutions when the combustion engine has a high number of revolutions;

and vice versa with a number of revolutions higher than the small number of revolutions at which the combustion engine operates in certain conditions;

with a suitable number of revolutions also when the combustion engine is not running, so as to ensure recirculation and therefore cooling of the combustion engine also in the case of temporary stoppages, as occurs for example in the case of stop-and-go conditions at traffic lights.

In addition to the above, the arrangement of the drive unit of the electric motor (in the pump assembly) eliminates disturbances from eddy currents which are generated when said unit is instead arranged at a distance.

The invention claimed is:

1. A recirculating pump for recirculating a cooling liquid of a vehicle combustion engine, comprising:
   a pump body (11) and an impeller (1) supported by a driven shaft (2), coaxial with each other;
      a first movement transmission device (100) for transmitting to the driven shaft (2) a movement generated by a shaft of the combustion engine of the vehicle and comprising movement receiving means (121), in particular at least one pulley (121a), for connection (103) with said shaft of the combustion engine;
   an electromagnetic friction coupling (120) connected to said movement receiving means (121);
      a second device (200) for generating a movement for the driven shaft (2) independently of the first movement transmission device (100) and comprising an electric motor (250) with stator (251) and rotor (253);
   connection means (3,4,4a) for connection to the driven shaft (2), rotationally integral with the driven shaft (2);
   wherein:
      the rotor (253) of the electric motor (250) is rotationally integral with the connection means for connection to the driven shaft (2);
      the electromagnetic friction coupling (120) is arranged so as to connect/disconnect the first movement transmission device (100) to the connection means (3,4,4a) for connection to the driven shaft; and
      said electric motor (250) is arranged in a position axially on the outside of the electromagnetic friction coupling (120) and on the opposite side of the latter with respect to the impeller (1).

2. The recirculating pump of claim 1, wherein said electromagnetic friction coupling (120) comprises a fixed electromagnet (122), a rotor (121b) integral with the movement receiving means (121) and an armature (123) connected by means of a resilient membrane (123a) to the connection means (3,4,4a) for connection to the driven shaft (2).

3. The recirculating pump of claim 2, wherein excitation of the electromagnet (122) is controlled by means of PWM (Pulse Width Modulation).

4. The recirculating pump of claim 1, wherein the connection means (3,4,4a) for connection to the driven shaft (2) comprise a coaxial sleeve (3) integral with the driven shaft (2), a bell member (4) integral with the sleeve (3) and carrying a ring (4a) of suitable axial thickness for connecting the bell member (4) to the friction coupling (120).

5. The recirculating pump of claim 4, wherein the rotor (253) of the electric motor is situated radially on the outside of the stator (251) and integral with the ring (4a) for connecting to the bell member (4) of the means for connection to the driven shaft (2) of the pump.

6. The recirculating pump of claim 1, further comprising an electronic drive (260) for controlling the electric motor (250), housed on the pump body between the electromagnetic friction coupling (120) and the stator (251) of the electric motor (250).

7. The recirculating pump of claim 6, wherein the electronic drive of the electric motor is arranged in an axially inner position coaxial, preferably concentric, with the stator of the electric motor.

8. The recirculating pump of claim 7, further comprising a structure (255) which is fixed to the pump body and which supports the electronic drive and the stator of the electric motor in a radially inner and a radially outer position respectively.

9. The recirculating pump of claim 1, wherein, in conditions where the electromagnet is excited, the friction coupling causes rotation of a mechanical rotor integral with the rotor of the electric motor, this inducing a current on the stator and generating recoverable energy.

\* \* \* \* \*